United States Patent
Tenbarge

(10) Patent No.: US 9,851,137 B2
(45) Date of Patent: Dec. 26, 2017

(54) UTILITY ROUTING FOR A DOOR-MOUNTED ICEMAKER

(71) Applicant: Whirlpool Corporation, Benton Harbor, MI (US)

(72) Inventor: Andrew M. Tenbarge, St. Joseph, MI (US)

(*) Notice: Subject to any disclaimer, the term of this patent is extended or adjusted under 35 U.S.C. 154(b) by 524 days.

(21) Appl. No.: 14/086,417

(22) Filed: Nov. 21, 2013

(65) Prior Publication Data

US 2014/0157600 A1 Jun. 12, 2014

Related U.S. Application Data

(60) Provisional application No. 61/734,358, filed on Dec. 6, 2012.

(51) Int. Cl.
| | | |
|---|---|---|
| *F25C 1/00* | (2006.01) | |
| *F25C 5/00* | (2006.01) | |
| *F25D 23/12* | (2006.01) | |
| *B23P 15/26* | (2006.01) | |

(52) U.S. Cl.
CPC ............... *F25C 1/00* (2013.01); *B23P 15/26* (2013.01); *F25C 5/005* (2013.01); *F25D 23/126* (2013.01); *F25D 2323/021* (2013.01); *F25D 2400/40* (2013.01); *Y10T 29/49359* (2015.01)

(58) Field of Classification Search
CPC ...... F25D 23/006; F25D 23/02; F25D 23/028; F25D 23/04; F25D 23/061; F25D 23/12; F25D 23/126; F25D 2323/02; F25D 2323/021; F25D 2323/121; F25D 2323/122; F25C 1/00; F25C 5/005; F25C 2400/10; F25C 2400/14
See application file for complete search history.

(56) References Cited

U.S. PATENT DOCUMENTS

| | | | |
|---|---|---|---|
| 2,028,926 A | 1/1936 | Seeger et al. | |
| 2,914,218 A * | 11/1959 | Korodi | F25D 23/126 222/129.2 |
| 3,146,601 A | 9/1964 | Gould | |
| 3,788,094 A | 1/1974 | Benasutti et al. | |
| 2009/0229298 A1* | 9/2009 | Allard | F25D 23/04 62/449 |

(Continued)

FOREIGN PATENT DOCUMENTS

| | | |
|---|---|---|
| EP | 2339277 A2 | 6/2011 |
| WO | 2009017286 A1 | 2/2009 |
| WO | 2010140837 A2 | 12/2010 |

OTHER PUBLICATIONS

European Patent Office, "Search Report," issued in connection with European Application No. 13194890.3-1605, Oct. 7, 2016, 10 pages.

*Primary Examiner* — Christopher M Koehler

(74) *Attorney, Agent, or Firm* — Nyemaster Goode, P.C.

(57) ABSTRACT

Utility routing for door-mounted operations are disclosed. An appliance may include a cabinet and one or more doors connected to the cabinet. An apparatus may have a mounted position on the door. An operation apparatus may be enabled, supported, or otherwise made operable in part by closed-looped conveyance of one or more operating mediums. The apparatus has an unmounted position wherein the apparatus is separated from the door while maintaining the closed-loop conveyance of the one or more operating mediums.

14 Claims, 6 Drawing Sheets

(56) References Cited

U.S. PATENT DOCUMENTS

| | | | |
|---|---|---|---|
| 2010/0066226 A1* | 3/2010 | Luisi | F25D 23/126 |
| | | | 312/405.1 |
| 2010/0251744 A1* | 10/2010 | Yun | F25D 17/065 |
| | | | 62/340 |
| 2010/0326113 A1* | 12/2010 | Kuehl | F16L 9/003 |
| | | | 62/259.1 |
| 2011/0056222 A1* | 3/2011 | Lee | F25D 23/126 |
| | | | 62/129 |
| 2011/0089801 A1* | 4/2011 | Bonomie | E05D 3/14 |
| | | | 312/405 |
| 2011/0110706 A1* | 5/2011 | Allard | F25D 23/00 |
| | | | 403/24 |
| 2011/0146335 A1* | 6/2011 | Jung | F25C 5/005 |
| | | | 62/441 |
| 2011/0239689 A1* | 10/2011 | Bai | F25D 23/02 |
| | | | 62/389 |
| 2012/0137501 A1 | 6/2012 | Allard | |
| 2012/0291473 A1* | 11/2012 | Krause | F25C 5/005 |
| | | | 62/340 |
| 2013/0111941 A1* | 5/2013 | Yu | F25D 23/02 |
| | | | 62/407 |

\* cited by examiner

UTILITY ROUTING FOR A DOOR-MOUNTED ICEMAKER

CROSS-REFERENCE TO RELATED APPLICATIONS

This application claims priority under 35 U.S.C. §119 to provisional application Ser. No. 61/734,358 filed Dec. 6, 2012, herein incorporated by reference in its entirety.

BACKGROUND

Field of the Invention

This disclosure relates to utility routing for a door-mounted icemaker. More specifically, but not exclusively, the present disclosure relates to non-door hinge related utility routing concepts for unmounting and remounting of door-mounted icemakers.

Description of Prior Art

Many refrigeration appliances require utilities run to the door for supporting one or more operations at the door. With the increasing number of wires, water lines, and other lines being routed to the door through the hinge, other utility routing concepts are of increasing interest, particularly those that do not rely on the already confined space of the door hinge.

Therefore, it is an object, feature, or advantage of the present disclosure to provide utility routing to a door of an appliance that does not use the already confined space of the door hinge.

For purposes of installation and for other reasons, doors are often removed from an appliance. Lines running from the cabinet to the door through the hinge, at the hinge, or a location close to the hinge must be disconnected for the door to be entirely separated from the cabinet. Depending on the type of line, some are more easily connected and disconnected than others. In the case, for example, where a line between the cabinet and the door is part of a closed-loop system, the line cannot be disconnected without first removing or suffering loss of the contents of the closed-loop system.

Therefore, another object, feature, or advantage of the present disclosure is to provide utility routing for closed-loop conveyance from a cabinet to a door that does not require the closed-loop system to be disconnected for the door to be separated from the cabinet.

In the case of a refrigerated appliance, icemakers are can be door-mounted. In many instances, a cabinet door carrying an icemaker is configured to selectively close and open at least a portion of the refrigerated compartment. In the case where the icemaker, ice storage bin, or other operation on the door is cooled by a closed-loop system, the closed-loop system has to be disconnected for the door to be separated from the cabinet.

Therefore, it is another objective, feature, or advantage of the present disclosure to provide utility routing for unmounting and remounting a door-mounted icemaker having one or more operations supported, at least in part, by a closed-loop system passing between the refrigerator compartment and compartment door.

One or more of these and/or other objects, features or advantages of the present disclosure will become apparent from the specification and claims that follow.

SUMMARY

This disclosure provides utility routing concepts for door-mounted icemakers. One exemplary embodiment provides an appliance. The appliance includes a cabinet and one or more doors connected to the cabinet. On the door is an apparatus having a mounted position. An operation of the apparatus is enabled in part by a closed-loop conveyance of one or more operating mediums. The apparatus has an unmounted position. In the unmounted position, the apparatus is separated from the door while maintaining the closed-loop conveyance of the one or more operating mediums.

Another embodiment provides a refrigerator having a cabinet with one or more compartments and one or more doors that provide access to the one or more compartments. An icemaker has a mounted position on the compartment door. An operation of the icemaker is enabled in part by closed-loop conveyance of one or more operating mediums between the cabinet and the icemaker. The icemaker has an unmounted position where the icemaker is separated from the door. Closed-loop conveyance of the one or more operating mediums to the icemaker is maintained in the unmounted position.

Yet another embodiment provides a method for maintaining closed-loop conveyance of cooling fluid to an on-the-door icemaker of a refrigerator. The refrigerator includes a cabinet having one or more compartments, one or more doors that provide access to the one or more compartments in an icemaker that has a mounted position on one of the cabinet doors. The icemaker is operated in part by a closed-loop conveyance of a cooling fluid between the cabinet and the icemaker. The icemaker is removed from off of the cabinet door to an unmounted position for removing the cabinet door. The closed-looped conveyance of the cooling fluid between the cabinet and the icemaker is maintained when the icemaker is in the unmounted position.

BRIEF DESCRIPTION OF THE DRAWINGS

Illustrated embodiments of the disclosure are described in detail below with reference to the attached drawing figures, which are incorporated by reference herein and wherein.

DETAILED DESCRIPTION OF THE PREFERRED EMBODIMENTS

The following description is merely exemplary in nature and is not intended to limit the disclosure, application, or uses. The embodiments, aspects, and concepts are directed to utility routing from a cabinet to a cabinet door, and specifically an operational component on the cabinet door, including but not limited to, an icemaker, a water chiller, a water dispenser, an ice dispenser, an ice bin, and/or other compartment, operational component or like feature.

The advent of configuring operational components into a cabinet door or on the face of the cabinet door requires routing utilities from the cabinet to the cabinet door in most instances. Typically, utilities are routed from the cabinet to the cabinet door through a hinge connecting a cabinet door to the cabinet body. With the increasing number of operational components being located on a cabinet door, the amount of space available in the hinge for routing utilities continues to decrease. Therefore, other avenues for routing utilities from a compartment to a door on the compartment are needed. Additionally, cabinet doors are often removed from the cabinet body for moving, positioning, or relocating the cabinet due to restrictions within a space in which the cabinet is located, positioned or a new space in which the cabinet is relocated. Regardless, in the case where the cabinet door is removed from the cabinet, consideration must be given to how the utilities routed from the cabinet body to the cabinet are disconnected and reconnected upon removal and reattachment of the cabinet door to the cabinet. Depending upon the type of utility being routed from the cabinet to the cabinet door, disconnecting may not be an option or may be a highly discouraged operation. For example, in the case where the utilities conveyed from the cabinet body to the cabinet door are enclosed in a closed-loop system, breach of the loop by disconnecting and reconnecting is highly troublesome at the least and in most instances highly discouraged or prohibited. In the case where cooling liquid is carried in a closed-loop utility routing between a cabinet and cabinet door, disconnecting the closed-loop cooling system and reconnecting the system upon detachment and reattachment of the cabinet door is certainly an operation a consumer would not want to undertake and an expense that a consumer would not want to have to bear to have a professional perform this operation.

In view of the foregoing, it is a primary feature, object, or advantage of the disclosure to provide a system for routing utilities from a cabinet to a cabinet door that accounts for, addresses and overcomes many of the problems addressed above.

Figure 1A:
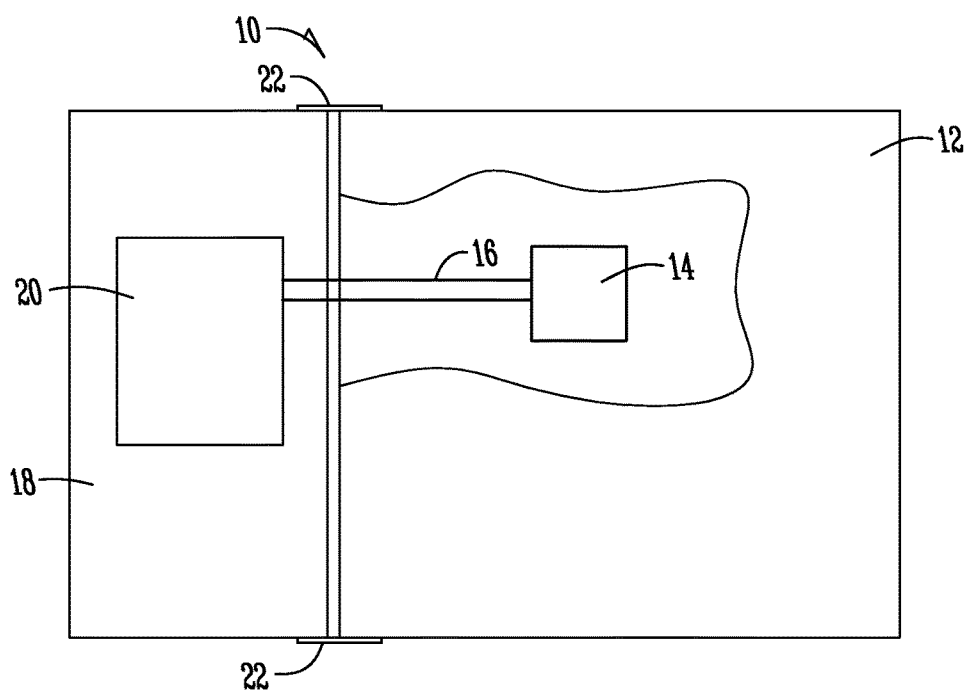
FIG. 1A is a pictorial representation of a utility routing configuration in accordance with an illustrative embodiment.

Pictorially represented in FIG. 1A is a basic diagram providing an illustrative embodiment of an appliance 10. The block on the right is representative of a cabinet 12, which may include a cabinet body, a portion of the cabinet, a cabinet wall, a compartment within a cabinet, or any portion making up an element of a cabinet. The block on the left is representative of a cabinet door 18 that may be a single door, double door, French door, bottom mount door, revolving door, or any like configuration of a door that is hingeably mounted using hinges 22 to a cabinet 12 as pictorially represented in FIG. 1A. Located on, in or at the door is an operational apparatus 20. One or more functions, processes, or operations is supported, and enabled, or otherwise made operable by a function, process, or operation at, in or on the cabinet 12. Apparatus utilities 14 in the cabinet 12 require some utility routing 16 from the cabinet 12 to the cabinet door 18 for supporting, enabling, or otherwise making operable, at least in part, the operational apparatus 20 on, within, or at the cabinet door 18. Traditional approaches would route the utility routing 16 through hinges 22 connecting the cabinet door 18 to the cabinet 12. However, to address the problems and disadvantages discussed above and to accomplish the primary features, objectives and advantages of the disclosure, concepts for utility routing 16 for door-mounted operational apparatus 20 are contemplated and described further herein.

Figure 1B:
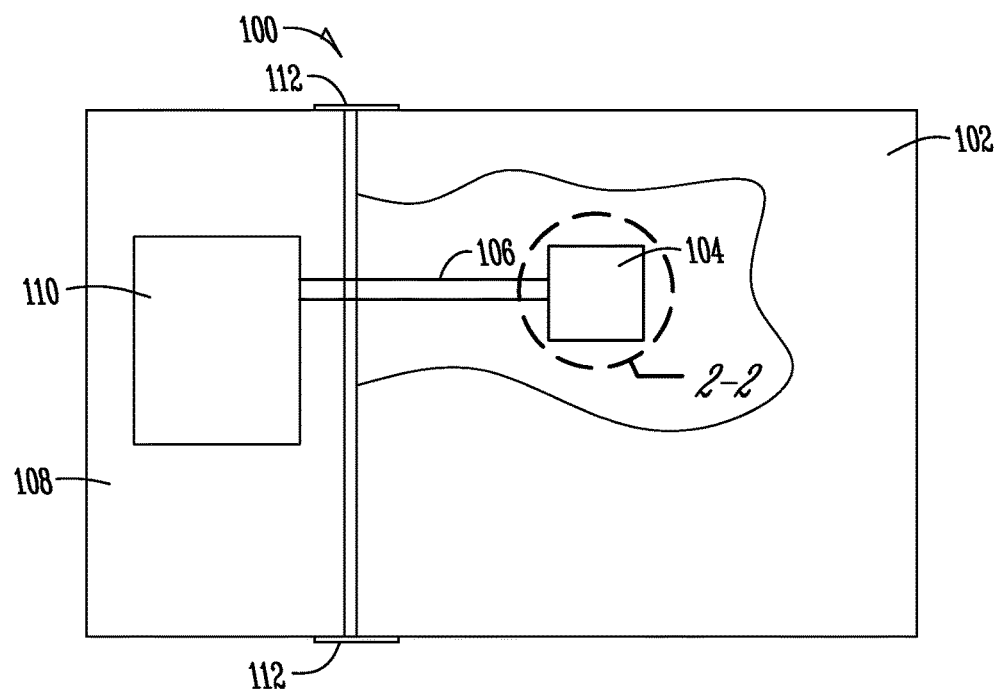
FIG. 1B is a pictorial representation of an icemaker cooling loop in accordance with an illustrative embodiment.

FIG. 1B is a pictorial representation implementing the concepts described above in FIG. 1A for a refrigerated appliance 100 in accordance with an illustrative embodiment of the disclosure.

A refrigerated appliance, like refrigerated appliance 100 pictorially represented in FIG. 1B, generally includes at least one refrigerated compartment 102 and a refrigerated compartment door 108 for selectively closing and opening, or otherwise providing access to, the refrigerated compartment 102. Suffice it to say, the types and various embodiments of refrigerated appliances are numerous, and all types that include at least one refrigerated compartment 102 and a refrigerated compartment door 108 are contemplated herein. In addition or separately contemplated are refrigerated appliances that include at least one freezer compartment and a freezer compartment door for selectively closing and opening the freezer compartment (not shown). Continuing with that which is pictorially represented in FIG. 1B, a refrigerated compartment 102 represented by a refrigerated cabinet, a refrigerated compartment, a refrigerated enclosure, a refrigerated module or any like refrigerated housing includes a refrigerated compartment door 108 for selectively opening and closing the refrigerated compartment 102. Although represented as a refrigerated compartment 102 and a refrigerated compartment door 108, the disclosure contemplates other compartments selectively openable and closeable by a compartment door, such as for example, a freezer compartment and freezer compartment door, a fresh food compartment and fresh food compartment door, a modulated compartment and modulated compartment door or any like configuration. Located on, within or at the refrigerated compartment door or other like compartment door is an icemaker 110. One or more functions, processes or operations of the icemaker 110 are supported, enabled or otherwise made operable at least in part by utilities provided from cooling source 104 in the refrigerated compartment 102. Also contemplated herein, is a cooling source located at any other location such as those other compartments listed above. Further contemplated herein, are other operational components in addition to an icemaker or the icemaker itself being located on a compartment door other than a refrigerated compartment door.

A cooling loop 106 is provided between the icemaker 110 at the refrigerated compartment door and the cooling source 104 at the refrigerated compartment 102. The cooling loop 106 may be configured to communicate or provide a utility routing for any type of utilities for supporting, enabling, or at least making operable one or more functions, processes or operations of the icemaker 110. For example, the cooling loop 106 may be configured to communicate liquid, air, power, or any other like utility for supporting, enabling or otherwise making operable any one or more of the functions, processes or operations of the icemaker or other like operational apparatus at the refrigerated compartment door or other like compartment door as herein contemplated. As with the configuration illustrated in FIG. 1A, the compartment door 108 may include one or more hinges 112 for attaching the compartment door 108 to the compartment 102. Previously, cooling loop 106 may have been routed through hinges 112 for providing one or more supporting, enabling or otherwise operating utilities from the compartment 102 to the compartment door 108. For example, the cooling loop 106 may be configured in the hinges 102 for communicating cooling from the cooling source 104 to the icemaker 110 at compartment door 108.

Figure 2:
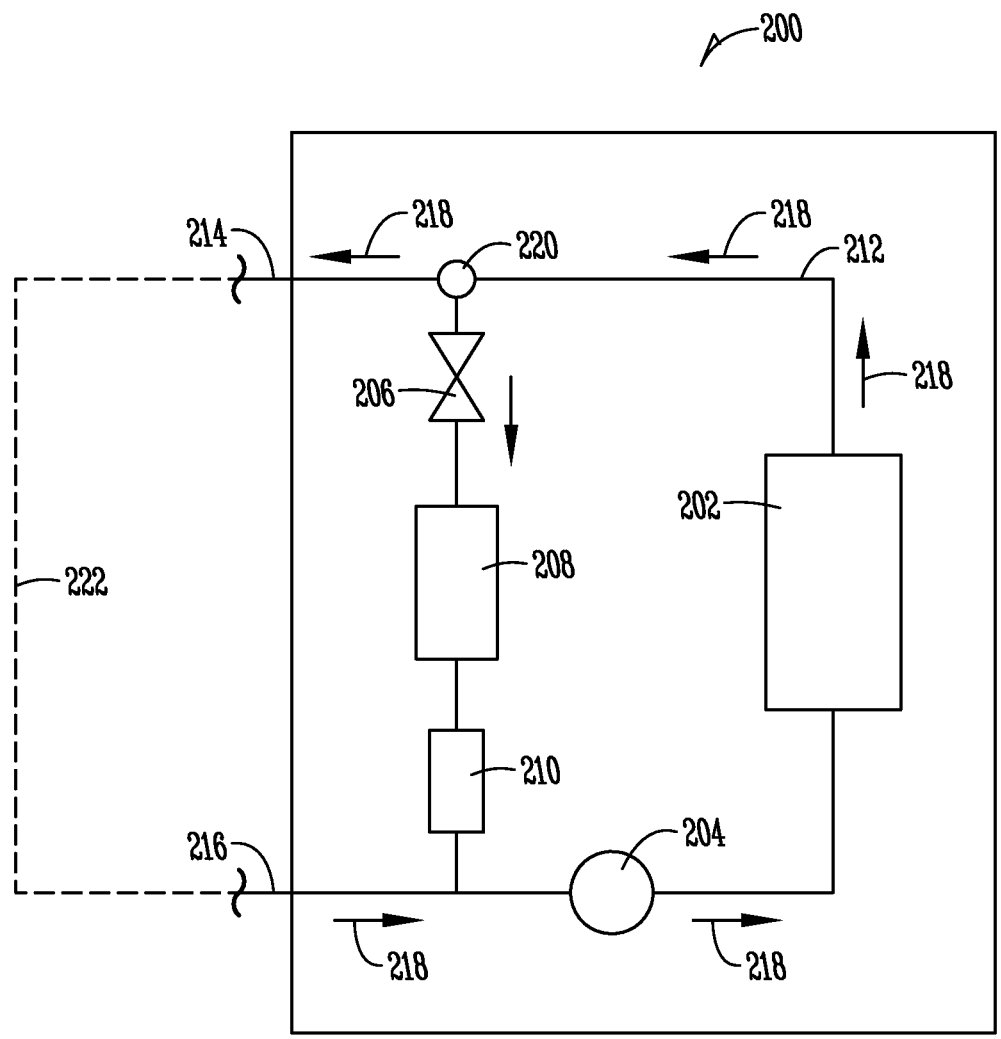
FIG. 2 is a pictorial representation of a cooling system in accordance with an illustrative embodiment.

By way of example, a cooling source, such as the cooling source 104 illustrated in FIG. 1B, is pictorially represented in FIG. 2 taken along lines 2-2. The cooling system shown in FIG. 2 includes a cooling loop 212. The cooling loop includes a compressor 204 and a condenser 202. Cooling liquid from the condenser 202 flows in the direction of arrows 218 through valve 220. Valve 220 in a preferred form, is a three-way valve adapted to control the flow of cooling liquid through the evaporator 208 and/or secondary cooling loop 222 as indicated by directional flow arrows 218. Cooling liquid passing through valve 220 may pass through the secondary cooling loop 222 and through evaporator 208 as indicated by directional flow arrows 218. In a preferred form, valve 206 is an expansion valve. Cooling liquid from valve 206 passes through evaporator 208 as indicated by directional flow arrows 218. Another valve 210 may be used to control the flow of cooling liquid from evaporator 208 back to compressor 204. In a preferred form, valve 210 is a one-way valve permitting flow in one direction from evaporator 208 to compressor 204. Cooling liquid passing through valve 220 and evaporator 208 may also pass through the secondary cooling loop 222 which is represented above the cooling loop 106 illustrated in FIG. 1B. Thus the cooling liquid in the cooling loop 212, by actuation of a three-way valve 220, may be communicated through the secondary cooling loop 222 to an icemaker 110 on a cabinet door 108 as illustrated in FIG. 1B. In either case, whether the cooling liquid is flowing through the primary cooling loop 212 or the secondary cooling loop 222 the cooling liquid returns to compressor 204. A similar expansion valve 206, evaporator 208 and valve 210 configuration may be included in the secondary cooling loop 222 for providing a cooling operation, function or process at an operational apparatus or component on, in or at the refrigerated compartment door or like compartment door.

Figure 3:
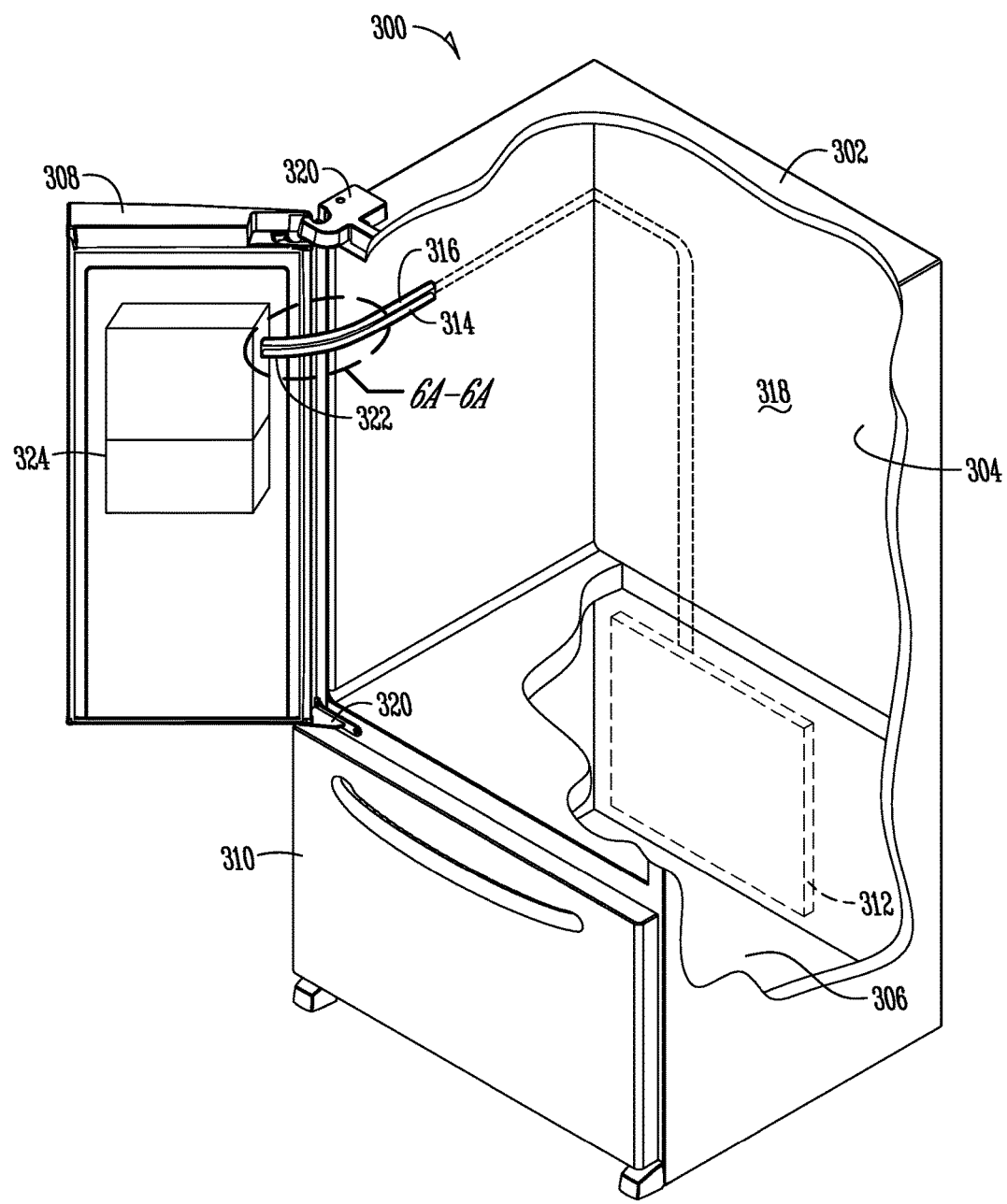
FIG. 3 is a pictorial representation of a refrigerator with utility routing for an on-the-door icemaker in accordance with an illustrative embodiment.

The previously described concepts are pictorially represented according to an illustrative embodiment in FIG. 3. The refrigerator 300 shown in FIG. 3 includes cutout sections provided for illustrating various functions, processes and operations supported, enabled or otherwise made operable by the cooling system 312 housed within the cabinet 302 of the refrigerator 300. Although FIG. 3 discloses a refrigerator 300 of the French door style with a bottom mount freezer, other types of refrigerators or refrigerated compartment appliances are contemplated. As discussed above, the refrigerated compartment 304 within the cabinet 302 of the refrigerator 300 includes a refrigerated compartment door 308 and at least one refrigerated compartment door 308 for selectively closing and opening the refrigerated compartment 304. The refrigerator 300 may also include a freezer compartment 306 with a freezer compartment door 310 for selectively opening and closing or otherwise providing access to the freezer compartment 306. The refrigerated compartment door 308 is hingeably attached to the cabinet 302 by a pair of hinges 320.

The refrigerated compartment door 308 is selectively operable between closed and opened positions by rotation about the pair of hinges 320.

The refrigerator 300 includes a cooling system 312 for supporting, enabling or otherwise making operable one or more of the cooling operations for the refrigerated compartment 304 and/or the freezer compartment 306. Included at one of the doors, such as for example, at the refrigerated compartment door 308 is an icemaker 324. According to one aspect, the one or more functions, processes or operations of the icemaker 324 are supported, enabled or otherwise made operable, at least in part, by the cooling system 312 in the cabinet 304 of the refrigerator 300. In one embodiment, cooling lines 314 and 316 are configured in the cabinet body 318 from the cooling system 312 through a routing harness 322 into icemaker 324. The cooling lines 314, 316 may be housed within a wall of the cabinet 302, such as within the cabinet body 318 as pictorially represented in FIG. 3. Additionally, the cooling lines 314, 316 may be housed in a separate enclosure configured within the cabinet 302 extending at least partially between the cooling system 312 to an egress point, such as at or near the routing harness 322. The egress point for cooling lines 314, 316 may be configured at any point along the cabinet wall to allow proper configuration and operation of the routing harness 322. Contained within, on or supported by routing harness 316 is a portion or section of cooling lines 314, 316. As pictorially represented in FIG. 2, cooling lines 314, 316 may form a secondary cooling loop 222 with the brakes and line out 214 and line in 216 representing the egress and ingress points of cooling lines 314, 316. Thus, as illustrated in FIG. 2, of cooling lines 314, 316 may form a secondary cooling loop 222 connected between cooling system 312 and the icemaker 324 located on compartment door 308. Additionally, cooling lines 314, 316 may, as pictorially illustrated in FIG. 2, be a cooling line in 216 and a cooling line out 214 where the cooling fluid flows as shown by directional flow arrows 218.

The routing harness 322 supports, enables or otherwise makes operable the function, process or operation required as the compartment door 308 (i.e., refrigerated compartment door 308) is selectively operated or moved between open and closed positions. Functionally, the routing harness 322 may be configured to carry, house, direct or otherwise guide movement of cooling lines 314, 316 as the refrigerated compartment door 308 is pivoted or otherwise rotated between opened and closed positions. According to one aspect of the disclosure, the routing harness 322 supports, enables or otherwise makes operable the closed-loop conveyance of a cooling fluid from a cooling system 312 to an operational apparatus on a compartment door, such as an icemaker 324 located at a refrigerated compartment door 308. The routing harness 322 may be configured to house, support or otherwise enable the function required for a door to pivot from an open to a closed position, where such door may include a freezer compartment door, a modular compartment door, a fresh food compartment door or other like compartment door where utilities are being routed thereto.

Figure 4:
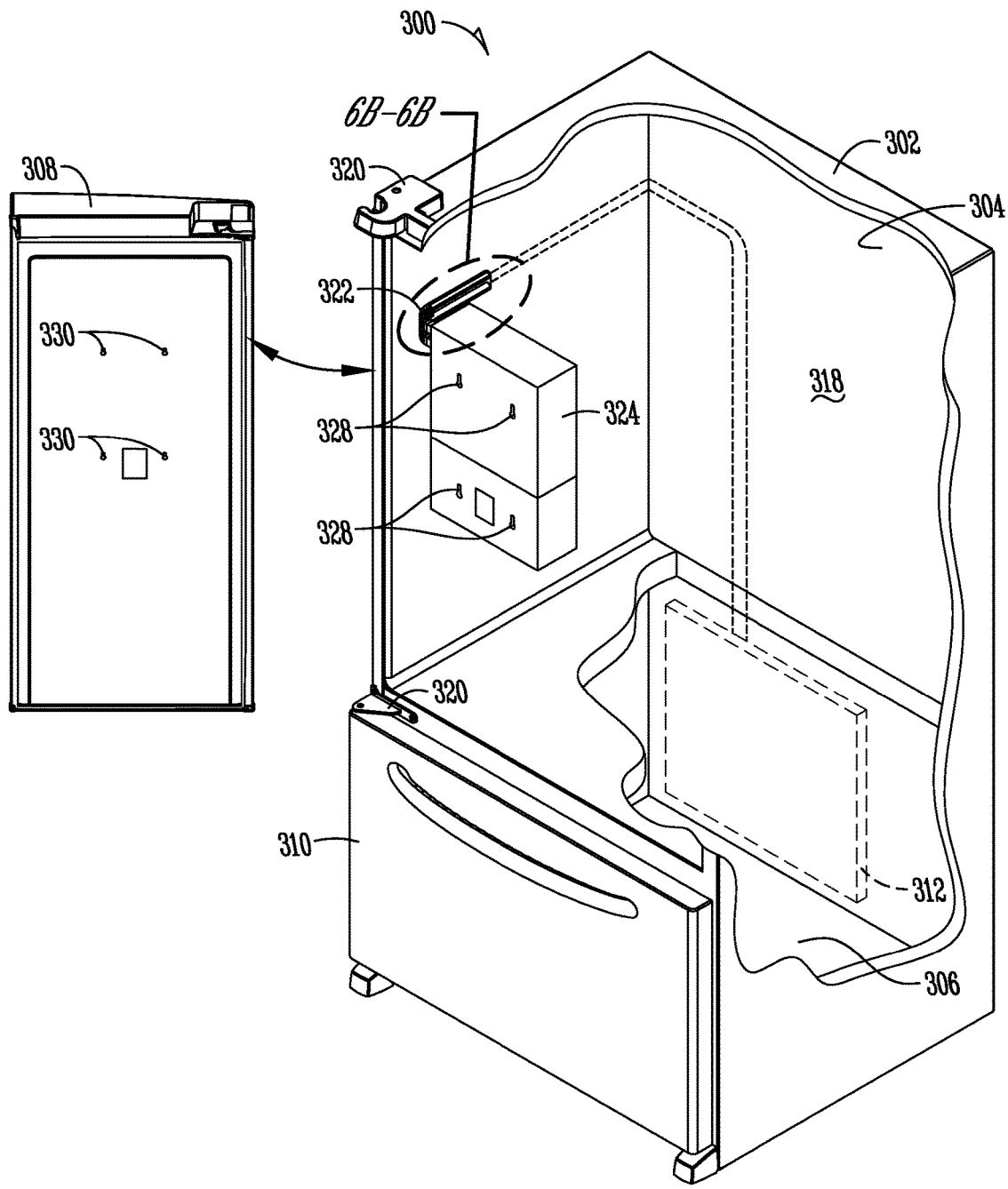
FIG. 4 is a pictorial representation of the utility routing for the door-mounted icemaker in an unmounted position in accordance with an illustrative embodiment.
Figure 5:
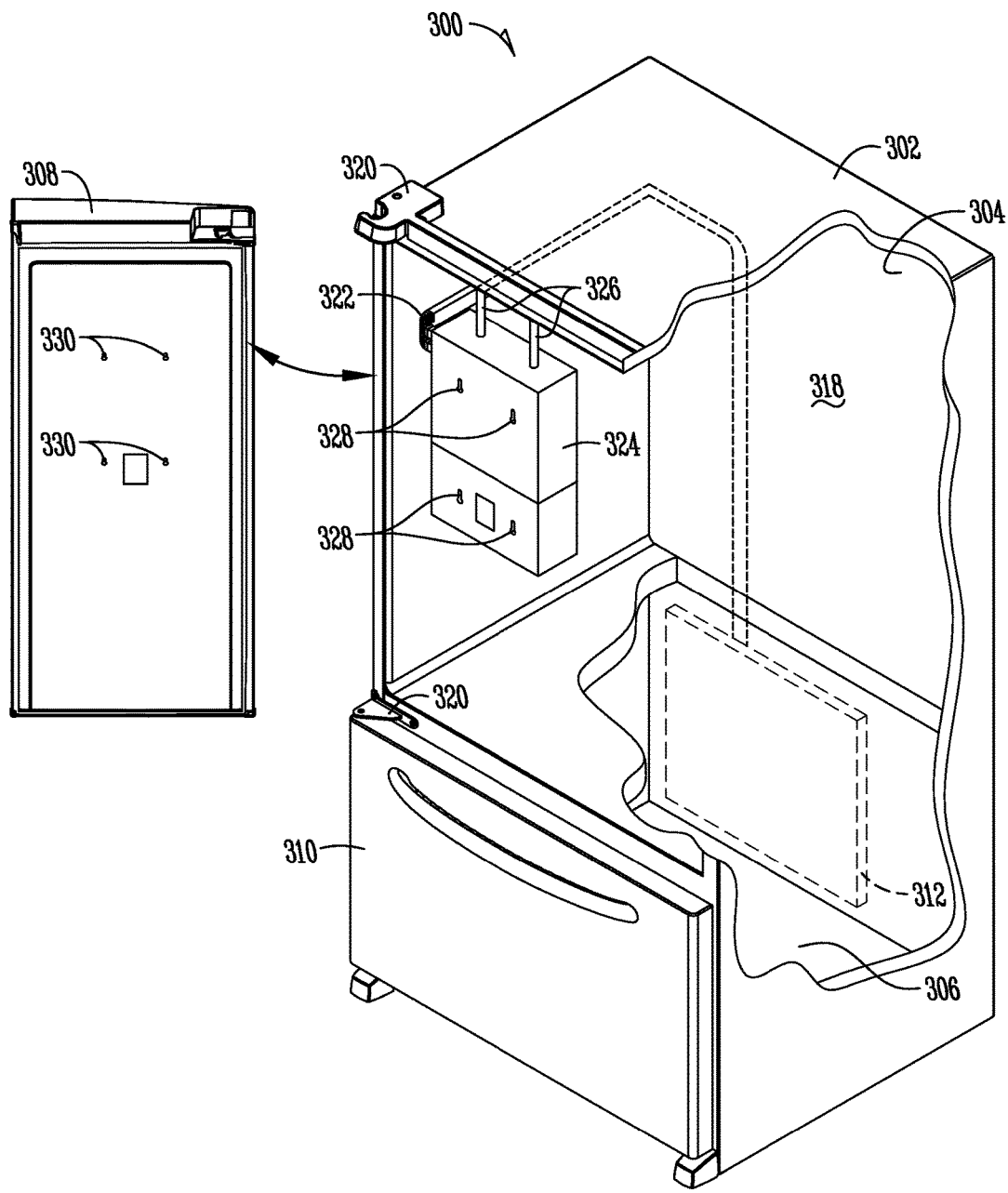
FIG. 5 is another configuration for a door-mounted icemaker in an unmounted position in accordance with an illustrative embodiment.
Figure 6A:
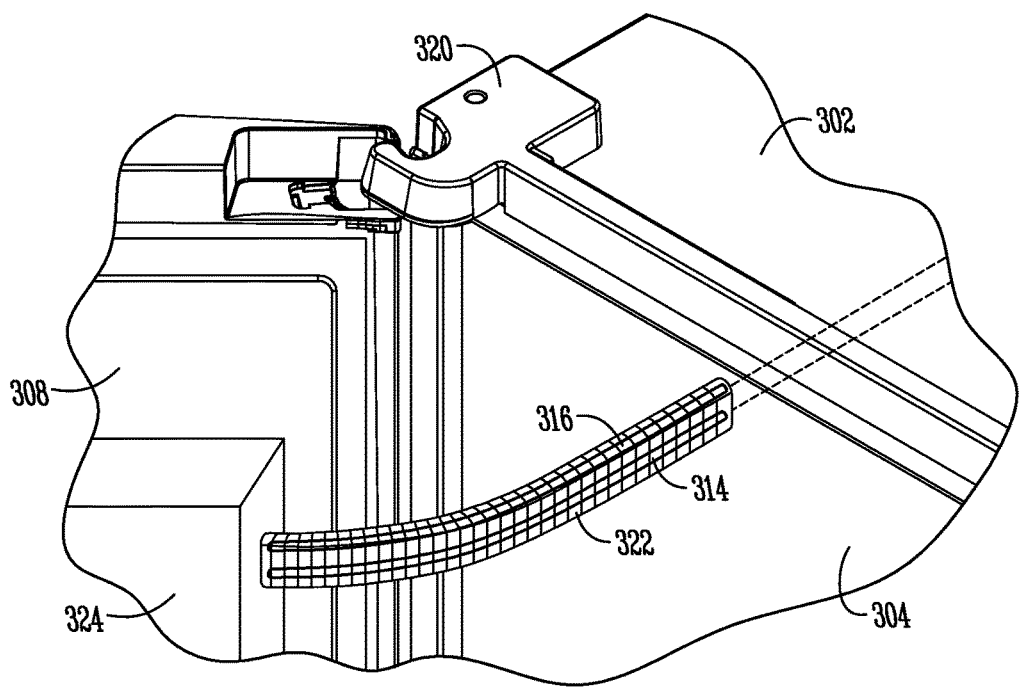
FIG. 6A is a pictorial representation of a routing configuration shown in FIG. 3 taken along line 6A-6A in accordance with an illustrative embodiment.
Figure 6B:
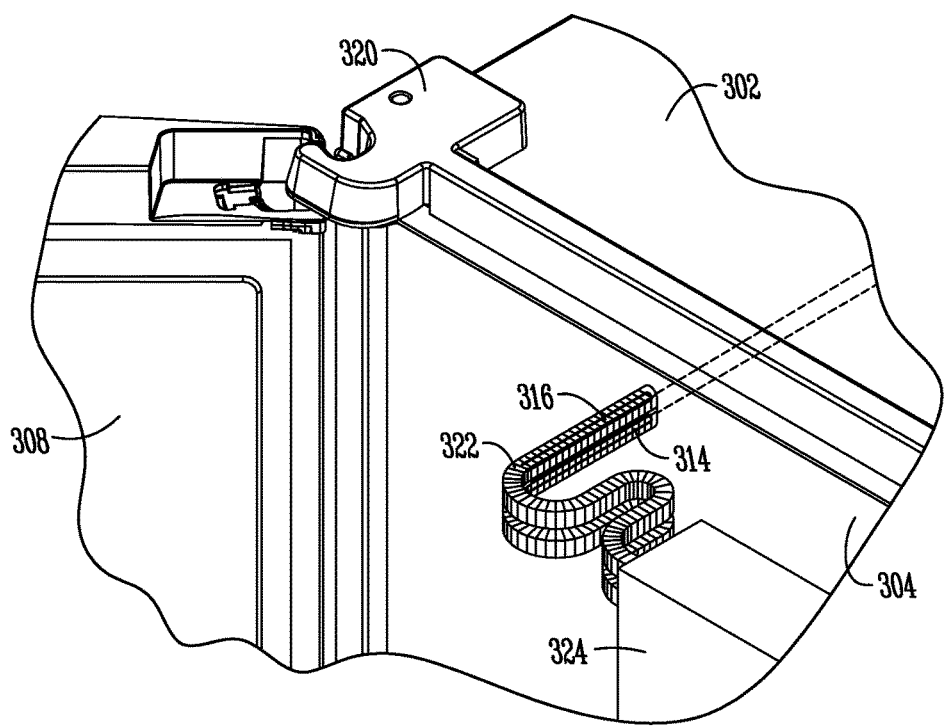
FIG. 6B is a pictorial representation of another routing configuration shown in FIG. 4 taken along line 6B-6B in accordance with an illustrative embodiment.

Pictorially represented in FIGS. 6A-6B are embodiments of a routing harness 322 shown in FIGS. 3-5 in accordance with illustrative embodiments of the disclosure. According to one embodiment, the routing harness 322 may be configured from a cable carrier, such as a commercially available energy chain made by igus Inc., for supporting, enabling, or otherwise making operable circular motion, vertical stroke, or long axis movement for utilities such as cooling lines, electrical, or the like. These types of wire/cable carriers may also be used for carrying a cooling line, such as cooling lines 314, 316. Parameters for the routing harness 322 using this type of carrier may include an outer height, outer width, bending radius, unsupported length, and the number of lengths within a section or segment of the carrier. Additionally, such systems may be configured to bend according to a desired bending configuration for the routing harness 322. For example, upon closure of the refrigerated compartment door 308 (see, for example, FIG. 6B), the routing harness 322 using the cable carrier may be configured to bend or deform in a desired configuration for bending the cooling lines 314, 316 without crimping the lines or otherwise causing damage to the lines. FIGS. 6A-6B provide a pictorial representation of a routing harness 322 using a cable carrier of such configuration. Cooling lines 314, 316 are housed within the cable carrier which is attached to the cabinet 302 and the icemaker 324. The routing harness 322 moves between a refrigerated compartment door open position to a refrigerator compartment door closed position shown respectively in FIGS. 6A and 6B. A tensioner or biasing element may be attached to the routing harness 322 to pull the routing harness back into the cabinet 302 when the refrigerator compartment door 308 is being moved from the open to the closed position. A tensioner or biasing component may also be used to define the way in which the routing harness 322 is reconfigured during movement of the refrigerator compartment door 308 from the open to the closed position shown respectively in FIGS. 6A and 6B. For example, if a specific hinge point is desired in the routing harness 322, a biasing component or element may be configured/positioned to draw the routing harness 322 into the position shown in FIG. 6B where the hinge portion is drawn into the cabinet 302 as pictorially represented. Conversely, the hinge portion would be drawn out of the cabinet 302 as the refrigerator compartment door 308 is moved from the closed or generally closed position to an open or generally open position as illustrated in FIG. 6A. The cooling lines 314, 316 could be partially or entirely enclosed within the routing harness 322. For example, in the case where a cable carrier is used, the cable carrier may include opposing walls connected by opposing end portions for enclosing cooling lines 314, 316. The opposing walls may be interconnected as pictorially represented in FIGS. 6A-6B or in a manner similar to the series of energy chains that are commercially available, for example, through igus Inc.

Although FIGS. 6A-6B pictorially illustrate a cable carrier configured for housing or partially housing, or otherwise guiding cooling lines 314, 316 during operation of the refrigerator compartment door 308 from a generally open position to a generally closed or closed position, other routing harnesses 322 are contemplated. For example, an extending hinge slider concept may be implemented. The concept could include an extending and retracting hinge sliding member housed inside a fully enclosed or partially enclosed housing on a cabinet wall of the refrigerator. The housing may be used to keep items in the refrigerator from being positioned against and thereby preventing movement of the extending-retracting hinge slider element. The extending-retracting hinge slider concept could include one or more rails (e.g., three rails) made of a suitable material for use inside a refrigerator, with the outer rail containing, for example, an insulation component for housing cooling lines 314, 316. To facilitate the telescopic motion, a helix-type cooling line could be used in place of existing cooling lines. The helix-shaped cooling line could be housed within the extending-retracting rail system which may be configured with one or more guides for allowing the integrated rail components to slide relative one to another to expand and contract. The cooling lines 314, 316 within the expanding-contracting rail system would also expand and contract with the rail system using a helix-type line. The helix-type line would also provide a biasing element to the track system to pull the track system into a neutral or retracted position upon closing the refrigerated compartment door 308. The helix-type line would also provide a biasing component or element to the telescoping motion of the track system as the compartment door 308 is opened and then subsequently closed. The cooling lines 314, 316 may be protected with one or more types of insulation and from being punctured by being wrapped with a fabric or insulator to protect the cooling lines 314, 316 from freezing, collecting condensation, or otherwise suffering damage. Electrical or other lines may also be housed and ran through the center of the helix-shaped lines. Additional insulation or extra lining may be included between the electrical or other lines in the inner surface of the helix-shaped line. Thus, the electrical lines could be configured to pass through the center of the helix coil line and the helix coil line could be protected from the electrical wires by including a layer of insulation or a lining separating the two.

Other embodiments include, for example, a trolley-like cable carrier whereby the cooling lines 314, 316 are suspended from a cable or wire guide. The cooling lines 314, 316 are free to move along the cable or wire guide to allow the cables to expand and retract as the refrigerator compartment door 308 is opened and closed. A biasing or tensioning bracket or element could be used to retract the wire or cable trolley as the refrigerator compartment door 308 is moved from the open to the closed position. Thus, elements of the cable trolley system may be housed within the cabinet 302 of the refrigerator 300 when the refrigerator compartment door 308 is partially closed or fully closed or partially open. As the refrigerator compartment door 308 is moved from a closed to an open position the trolley and cable wire guide follows the door outward supporting the cooling lines 314, 316 and is retracted back inward when the door is swung from back to its closed position.

Embodiments of the disclosure include configuration of the routing harness 322 to support, enable, and otherwise make operable the closed-loop conveyance of cooling fluid from a cooling system 312 to an icemaker 324 or other operational apparatus on a compartment door, such as a refrigerated compartment door 308. Additionally, the routing harness 322 may be configured to support the icemaker 324 when the icemaker is detached from the refrigerator compartment door 308 as pictorially represented in FIGS. 4-5.

FIG. 4 provides a pictorial representation of a routing harness 322 for housing at least partially a cooling line 314 and cooling line 316. The routing harness 322 is preferably attached to, fixed to, or part of the icemaker 324. For example, the icemaker 324 may include a housing, housing the icemaker and an ice bin or other like components for supporting, enabling, or otherwise operating the icemaker. The routing harness 322 may be operably attached to the icemaker 324, for example, attached to the outer body of the icemaker (i.e., the housing) in which the icemaker 324 is housed. In one embodiment, the routing harness 322 may be configured to support, at least partially, or for a short amount of time, or in combination with some other supporting configuration, the weight of the icemaker 324 when separated from the compartment door 308 as pictorially represented in FIG. 4. As discussed above, in some instances it is not desirable to disconnect the utilities routed from the cabinet 302 of the refrigerator 300 to the compartment door supporting, enabling or otherwise making operable one or more functions, processes or operations at, on or in the refrigerator compartment door 308. For example, FIG. 4 illustrates a cooling system 312 having a cooling line 314 and cooling line 316 for communicating cooling fluid from the cooling system 312 to the icemaker 324 mounted on the refrigerated compartment door 308. In the case where the cooling lines 314, 316 are part of a cooling loop as pictorially represented in FIG. 2, the loop may be kept intact, without having to drain the fluid out of the loop, when the refrigerator compartment door 308 is separated from the cabinet 302 as pictorially represented in FIG. 4. According to one embodiment, the icemaker 324 is separated from the refrigerator compartment door 308 and the refrigerator compartment door 308 is separated from the cabinet 302. The icemaker 324 may then be moved or swung, rotated, or otherwise articulated (i.e., positioned) within the cabinet 302 as pictorially represented in FIG. 4.

According to one embodiment, as previously discussed, the routing harness 322 may be configured to support the icemaker 324 in the detached positioned as illustrated. In this manner, all the utilities routed through the routing harness 322 may be maintained in connection with the icemaker 324 even if the refrigerator compartment door 308 is separated from the cabinet 302 as illustrated. Such an embodiment provides ease for doors of a refrigerator 300 with a door-mounted icemaker to be removed and subsequently replaced without having to detach and reconnect any of the utilities routed from the refrigerator 300 to the icemaker 324 on the refrigerator compartment door 308. For example, cooling lines 314, 316 can remain connected to the icemaker 324 even though the refrigerator compartment door 308 is removed and separated from the cabinet 302 of the refrigerator 300. This allows the refrigerator 300 to be positioned, relocated, or otherwise moved into a location with the doors removed without having to separate, disconnect, or otherwise reconfigure the utilities routed to a function, process, or operation on a compartment door. Upon reattachment of the refrigerator compartment door 308, the icemaker 324 may be reattached to the door by swinging, rotating, or otherwise articulating the icemaker to the door using the routing harness 322.

FIG. 5 provides a pictorial representation in accordance with an illustrative embodiment. Depending on the type of routing harness 322, the weight of the operational component, when separated from the compartment door 308 and housed temporarily within the cabinet 302 of the refrigerator 300, may need additional supports configured for supporting the weight of the operational component housed in the cabinet 302 of the refrigerator 300. For example, in the case of an icemaker 324, retainer elements 326 may be configured on the cabinet body 318 of the refrigerator 300 and/or on an outer surface of the icemaker 324 (e.g., outer housing of the icemaker) for supporting the icemaker 324 when housed within the cabinet 302 of the refrigerator 300. As pictorially represented in FIG. 5, the icemaker 324 may be separated from the refrigerated compartment door 308 by separating one or more retainer elements 328 on the icemaker 324 from one or more counterposing retainer elements 330 on the refrigerator compartment door 308. Once the icemaker 324 is separated from the refrigerator compartment door 308, the door may be removed from the cabinet 302 as pictorially illustrated.

According to the illustrated embodiments, the routing harness 322 pivots inward to allow the icemaker 324 to be articulated, rotated or otherwise positioned, at least partially, within the cabinet 302 of the refrigerator 300. The retainer elements 326 either on the cabinet body 318 of the refrigerator 300 or the body of the icemaker 324 may be removably attached to the icemaker 324 and the cabinet body 318 of the refrigerator 300. For example, a set of hooks, pins, or other like temporary restraint mechanisms may be configured to removably attach the icemaker 324 within the cabinet 318 of the refrigerator 300 as pictorially represented in FIG. 5. Illustrative embodiments contemplate that the icemaker 324 or other operational apparatuses, components, or devices may be temporarily housed within the cabinet 302 of the refrigerator 300 during shipping, installation, or relocation of the unit. Such embodiments allow the utilities routed to the icemaker 324 to remain attached even when the icemaker 324 is not mounted on the refrigerator compartment door 308. For example, in the case where the icemaker 324 is temporarily attached within the cabinet 302 during shipping, upon arrival of the refrigerator 300 at the installation location, the refrigerator compartment door 308 is attached to the cabinet 302 and the icemaker 324 subsequently attached to the refrigerator compartment door 308 by separating the icemaker 324 from the cabinet body 318 using the retainer elements 326 and retainer elements 328 which are affixed to counterposing retainer elements 330 on the refrigerator compartment door 308. In this manner, the utilities ran from the cabinet 302 to the icemaker 324 or any other like apparatus, device, or operative component on a compartment door are maintained in connection any time the compartment door is removed from the cabinet.

The illustrative embodiments are not limited to the particular embodiments described herein. In particular, the illustrative embodiments contemplate numerous variations in the type of ways in which the embodiments may be applied to routing utilities for door-mounted apparatuses such as an icemaker. The foregoing description has been presented for purposes of illustration and description. It is not intended to be an exhaustive list or limit any of the disclosure to the precise forms disclosed. It is contemplated that other alternatives or exemplary aspects are considered and included in the disclosure. The description is merely examples of embodiments, processes, or methods of the disclosure. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the disclosure and is not intended to be limiting in scope. The following claims set forth a number of embodiments of the disclosure with greater particularity.

What is claimed is:

1. A refrigerator comprising:
   a cabinet having one or more compartments and one or more compartment doors that provides access to the one or more compartments, each of the one or more compartment doors comprising a hinge at an upper end and a lower end of the compartment doors;
   an icemaker having a mounted position on at least one of the one or more compartment doors;
   an operation of the icemaker enabled in part by a closed-loop conveyance of one or more operating mediums between the cabinet and the icemaker, a closed loop conveyance comprising a flexible routing harness disposed between the cabinet and the icemaker, wherein the flexible routing harness keeps clear of the hinges at the upper end and lower end of the one or more compartment doors;
   the flexible routing harness having a first end connected to the icemaker and a second end connected to the cabinet, wherein the one or more compartment doors are removable from the cabinet without disconnecting the flexible routing harness from the cabinet or the icemaker; and
   the icemaker having an unmounted position wherein the icemaker is separated and disconnected from the door; and the icemaker in closed-loop conveyance of the one or more operating mediums in the unmounted position.

2. The refrigerator of claim 1 wherein the icemaker in the unmounted position is housed at least partially in the cabinet.

3. The refrigerator of claim 1 further comprising a routing configuration between the cabinet and the one or more compartment doors for the closed-loop conveyance of the one or more operating mediums.

4. The refrigerator of claim 3 wherein the icemaker is in closed-loop conveyance of the one or more operating mediums in both and between the mounted and unmounted positions.

5. The refrigerator of claim 4, wherein the one or more compartment doors comprise a freezer compartment door and a fresh food compartment door, wherein the mounted position is on the freezer compartment door.

6. The refrigerator of claim 1, wherein the flexible routing harness is a wire and cable carrier type harness.

7. The refrigerator of claim 6, wherein the flexible routing harness will extend when the one or more compartment doors is open and retract when the one or more compartment doors is closed.

8. A refrigerator, comprising:
a cabinet having one or more compartments and one or more doors that provide access to the one or more compartments, wherein the one or more doors are mounted to the cabinet via a pair of hinges coupled to the one or more doors at a top portion and a bottom portion of the one or more doors;
an icemaker having a mounted position on one of the one or more doors for normal operation and an unmounted position wherein the one or more doors are removed from the cabinet;a closed-loop conveyance of a cooling fluid between the cabinet and the icemaker, wherein the closed-loop conveyance of the cooling fluid between the cabinet and the icemaker is present in the mounted position and in the unmounted position and wherein the conveyance is attached to the cabinet at a first end and the icemaker between the pair of hinges of the one or more doors at a second end; and
wherein the closed-loop conveyance comprises a first cooling loop and a second cooling loop, the first cooling loop having a first flow valve, an expansion valve, an evaporator, a second flow valve, a compressor, and a condenser.

9. The icemaker of claim 8 further comprising wherein the closed-loop conveyance of the cooling fluid between the cabinet and the icemaker is maintained when reattaching the one or more doors and remounting the icemaker in the mounted position.

10. The icemaker of claim 8 further comprising wherein the closed-loop conveyance of the cooling fluid between the cabinet and the icemaker is maintained when detaching the icemaker from the one or more doors and the icemaker is placed in the unmounted position.

11. The icemaker of claim 8 wherein when the icemaker is in the unmounted position the icemaker is disposed at least in part within the cabinet.

12. The icemaker of claim 11 wherein the one or more doors comprise a pair of doors disposed side-by-side to selectively cover a fresh food compartment and a freezer compartment.

13. The icemaker of claim 8 further comprising a condenser in the closed-loop conveyance of the cooling fluid to the icemaker in both and between the mounted and unmounted positions.

14. The refrigerator of claim 8, wherein the closed loop conveyance further comprises a harness having a first end and a second end, the first end connected to the icemaker and the second end connected to the cabinet, wherein the harness is a wire and cable type harness that extends when the one or more doors is open and retracts when the one or more doors is closed.

* * * * *